United States Patent
Diab et al.

(10) Patent No.: US 8,675,468 B2
(45) Date of Patent: Mar. 18, 2014

(54) METHOD AND SYSTEM FOR MONITORING AND TRAINING ETHERNET CHANNELS TO SUPPORT ENERGY EFFICIENT ETHERNET NETWORKS

(75) Inventors: Wael William Diab, San Francisco, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 954 days.

(21) Appl. No.: 12/049,000

(22) Filed: Mar. 14, 2008

(65) Prior Publication Data

US 2009/0097391 A1 Apr. 16, 2009

Related U.S. Application Data

(60) Provisional application No. 60/979,433, filed on Oct. 12, 2007.

(51) Int. Cl.
*H04J 1/12* (2006.01)
(52) U.S. Cl.
USPC .......................................................... 370/201
(58) Field of Classification Search
USPC .................. 370/201, 350, 289, 286
See application file for complete search history.

(56) References Cited

U.S. PATENT DOCUMENTS

| | | | |
|---|---|---|---|
| 5,999,565 A * | 12/1999 | Locklear et al. | 375/222 |
| 6,795,450 B1 | 9/2004 | Mills et al. | |
| 7,471,732 B2 * | 12/2008 | Tsatsanis | 375/267 |
| 2002/0143929 A1 * | 10/2002 | Maltz et al. | 709/224 |
| 2004/0218595 A1 * | 11/2004 | Acharya et al. | 370/389 |
| 2005/0030808 A1 * | 2/2005 | Brown et al. | 365/222 |
| 2005/0105545 A1 * | 5/2005 | Thousand et al. | 370/442 |
| 2005/0152435 A1 * | 7/2005 | Lesartre et al. | 375/130 |
| 2006/0034295 A1 * | 2/2006 | Cherukuri et al. | 370/395.52 |
| 2007/0183301 A1 * | 8/2007 | Sadri et al. | 370/201 |
| 2007/0201380 A1 * | 8/2007 | Ma et al. | 370/254 |
| 2007/0280239 A1 | 12/2007 | Lund | |
| 2007/0280388 A1 * | 12/2007 | Torre et al. | 375/350 |
| 2009/0125735 A1 | 5/2009 | Zimmerman | |

* cited by examiner

*Primary Examiner* — Mark Rinehart
*Assistant Examiner* — Maharishi Khirodhar
(74) *Attorney, Agent, or Firm* — Duane S. Kobayashi (57) ABSTRACT

An Ethernet link may comprise a plurality of active and/or silent channels. Training of one or more link partners for one or more silent channels may be triggered based on monitoring training parameters for an active channel. The link partners may be trained for the silent channels and link partners corresponding to the silent channels may be configured according to the training. Training parameters for an active channel may be compared to a threshold or relative change value. The threshold or relative change value may be fixed, may be based on measurement results and/or may be programmable. The link partners may be configured for silent channels for an echo canceller, a far-end crosstalk canceller and/or a near-end crosstalk canceller. The silent channels may be trained based on transmitting a pulse or LDPC frame via the silent channels.

15 Claims, 5 Drawing Sheets

METHOD AND SYSTEM FOR MONITORING AND TRAINING ETHERNET CHANNELS TO SUPPORT ENERGY EFFICIENT ETHERNET NETWORKS

CROSS-REFERENCE TO RELATED APPLICATIONS/INCORPORATION BY REFERENCE

This application makes reference to and claims priority to U.S. Provisional Application Ser. No. 60/979,433, filed on Oct. 12, 2007, entitled "Method and System for Energy Efficient Ethernet," which is hereby incorporated herein by reference in its entirety.

FIELD OF THE INVENTION

Certain embodiments of the invention relate to networking. More specifically, certain embodiments of the invention relate to a method and system for monitoring and training Ethernet channels to support energy efficient Ethernet.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for monitoring and training Ethernet channels to support energy efficient Ethernet, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for monitoring and training Ethernet channels to support energy efficient Ethernet. In accordance with an embodiment of the invention, an Ethernet link may comprise a plurality of channels wherein one or more channels may be active and/or one or more channels may be silent or set to a lower power. For example, silent channels may have a data rate of zero. In various embodiments of the invention, the Ethernet link partners may be enabled to support transitioning between lower power states and active channel states that may provide energy efficient Ethernet communication. The Ethernet link partners may be enabled to update or refresh one or more parameters and/or their circuits for the one or more active channels and/or one or more silent channels. In this regard, training parameters may be adjusted to account for variable operating conditions such as type of cabling and/or length of cabling or for environmental conditions. For example environmental conditions may comprise temperature changes and/or electromagnetic coupling such as noise received from far-end and/or near-end neighboring cabling known as alien FEXT and alien NEXT respectively.

In various embodiments of the invention, training parameters on the one or more active channels may be monitored. Based on the monitoring of active channels, a time to train silent channels may be determined and silent channel training may be executed. Accordingly, the Ethernet link partners may be configured for handling the silent channels according to the silent channel training. In various embodiments of the invention, one or more active channel training parameters may be compared to one or more thresholds. The one or more thresholds may be determined in a plurality of ways. For example, the one or more thresholds may be determined based on one or more fixed values, on information gathered within the one or more link partners and/or determined based on programmable information. The Ethernet link partners may be configured according to the training of the one or more silent channels for one or more of an echo canceller, a far-end crosstalk canceller and a near-end crosstalk canceller. The training of the one or more silent channels may be based on, for example, transmitting a pulse or a depleted low density parity check code (LDPC) frame that may or may not carry data or control information, via the one or more silent channels. In some embodiments of the invention, the duration of a full training cycle on a silent channel may take up to the order of milliseconds or seconds of training per minutes of inactivity or lower power state. In accordance with an embodiment of the invention, the time to transition from a lower power state to a higher power state may be reduced significantly since silent channels may not need to go through a full training cycle.

Figure 1:
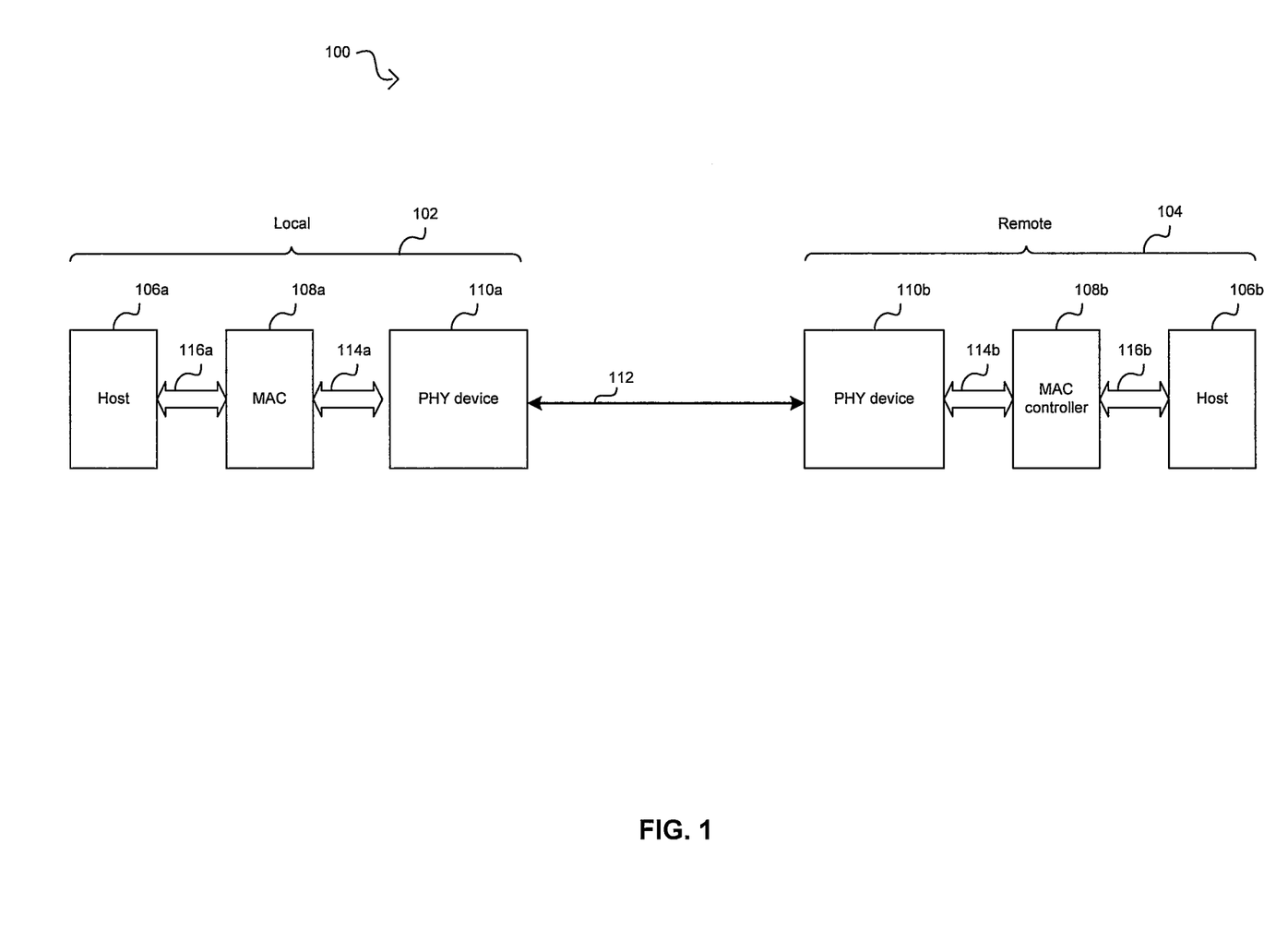
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention the cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10Base-T and 100Base-TX may utilize two pairs of UTP while Ethernet over twisted pair standards 1000Base-T and 10GBase-T may utilize four pairs of UTP.

In an exemplary embodiment of the invention, the link partners 102 and/or 104 may comprise a twisted pair PHY capable of operating at one or more standard rates comprising 10 Mbps, 100 Mbps, 1 Gbps, and 10 Gbps (10BASE-T, 100GBASE-TX, 1GBASE-T, and/or 10GBASE-T); and potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates comprising 10 Gbps (10GBASE-KX4 and/or 10GBASE-KR); potentially standardized rates such as 40 Gbps and 100 Gbps; and/or non-standard rates comprising 2.5 Gbps and 5 Gbps.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable multi-rate communications, such as 10 Mbps, 100 Mbps, 1000 Mbps (or 1 Gbps), 2.5 Gbps, 4 Gbps, 5 Gbps, 10 Gbps, 40 Gbps or 100 Gbps for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high (er) data rate in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In addition, a change in rate such as stepping up in rate or stepping down in rate may occur asymmetrically among the PHY devices 110a and/or 110b which may support energy efficient Ethernet. For example, the PHY 110a may change its rate based on a change of rate in 110b however, PHY 110a may change to a different rate than PHY 110b. Moreover, the PHY devices 110a and 110b may change rates independent of each other, for example, one PHY may change rate while the other does not change rate. Moreover, in some embodiments of the invention, one or more of the PHY devices may step down to a rate of zero.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of channels which may result in network links being underutilized for significant portions of time. When the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters and/or circuitry to account for variables such as the type of cabling over which data is being communicated and environmental conditions surrounding the cabling, for example, temperature.

A process of configuring one or more circuits and/or updating parameters of an Ethernet channel may be referred to as "training". In this regard, "training" may adapt one or both link partners to current conditions on one or more Ethernet channels to current conditions such that functions such as echo cancellation, far-end crosstalk cancellation, and near-end crosstalk cancellation may be performed.

Training coefficients, and parameters may be periodically refreshed or updated, and/or one or more link partners may be retrained. For example, for channels which have been inactive for a period of time, one or both of the link partners may be "retrained" such that their configurations and/or parameters, which may become outdated over time, may be reconfigured and/or updated, respectively, in order to provide more reliable data communications over the channel(s). Training steps for a channel that has been silent or inactive may take up to the order of 100 ms or seconds.

Figure 2:
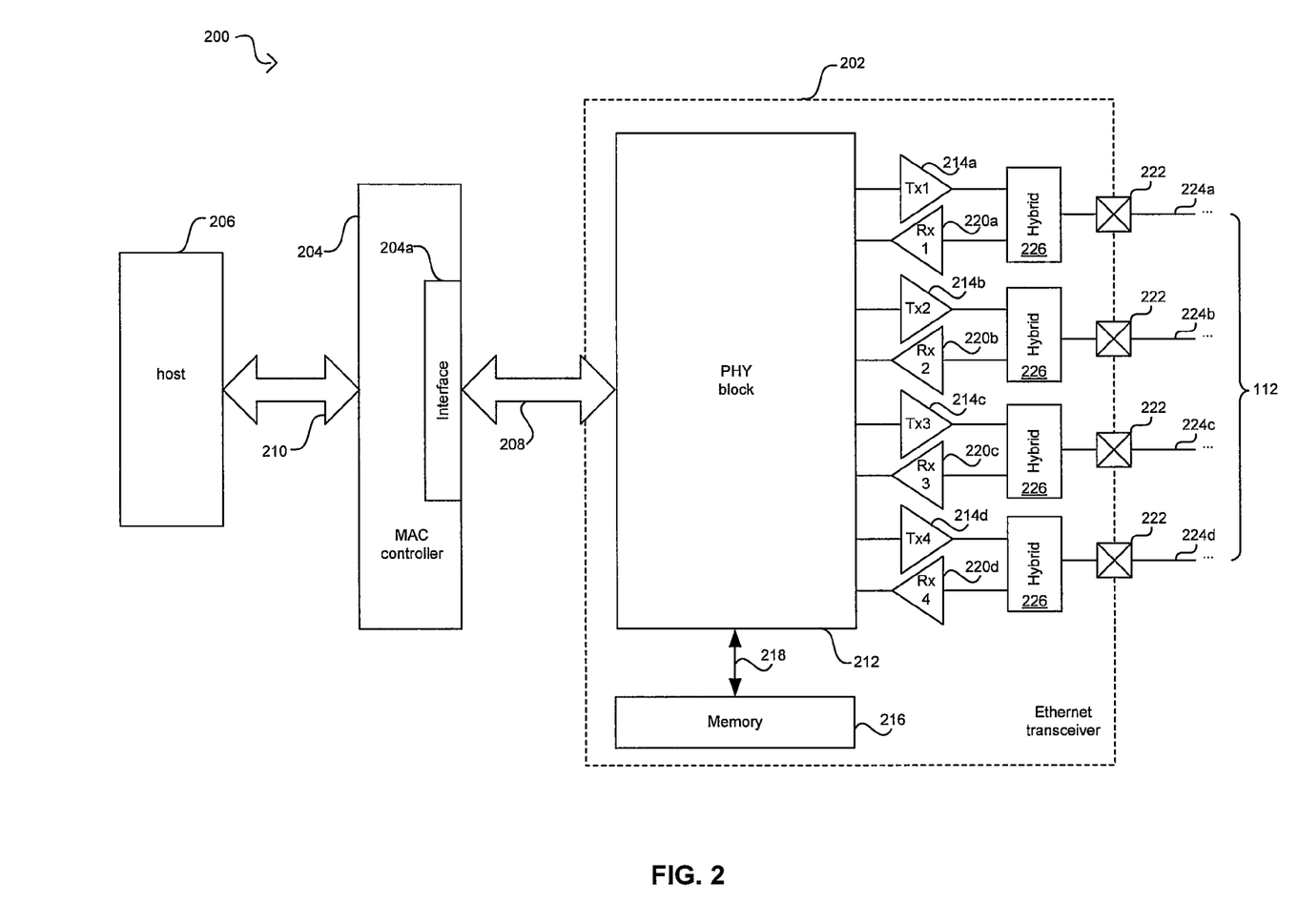
FIG. 2 is a block diagram illustrating an exemplary Ethernet over twisted pair PHY device architecture comprising a physical block, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a physical layer block 212, one or more transmitters 214, one or more receivers 220, a memory 216, a memory interface 218, one or more input/output interfaces 222 and channels 224.

The PHY device 202 may be an integrated device that may comprise a physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The physical layer block 212 in the PHY device 202 may comprise suitable logic, circuitry, and/or code that may enable operability and/or functionality of physical layer requirements. In this regard, the physical layer block 212 may enable generating the appropriate link discovery signaling utilized for establishing communication with a remote PHY device in a remote link partner. The physical layer block 212 may communicate with the MAC controller 204 via the interface 208. In one aspect of the invention, the interface 208 may be a media independent interface (MII) and may be configured to utilize a plurality of serial data lanes for receiving data from the physical layer block 212 and/or for transmitting data to the physical layer block 212. The physical layer block 212 may be configured to operate in one or more of a plurality of communication modes, where each communication mode may implement a different communication protocol. These communication modes may comprise, but are not limited to, Ethernet over twisted pair standards 10Base-T, 100Base-TX, 1000Base-T, 10GBase-T, and other similar protocols. The physical layer block 212 may be configured to operate in a particular mode of operation upon initialization or during operation. For example, auto-negotiation may utilize the FLP bursts to establish exemplary rates comprising, for example, 10 Mbps, 100 Mbps, 1000 Mbps, or 10 Gbps and half-duplex or full-duplex mode for transmitting information.

The physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the physical layer block 212. The parameters may comprise configuration data and the code may comprise operational code such as software and/or firmware, but the information need not be limited in this regard. Moreover, the parameters may include adaptive filter and/or block coefficients for use by the physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the local link partner 300 may be communicatively coupled to an input/output interface 222.

Due to the complex nature of the signal processing involved with full-duplex communication at high data rates, various components of the link partner 200 may be "trained" in order to provide reliable communications with a remote link partner. For example, the echo cancellers, FEXT cancellers, and/or NEXT cancellers may comprise one or more configuration parameters which may be determined based exemplary factors comprising environmental conditions, distance to the remote link partner, and data rate. Accordingly, these configuration parameters may need to be configured upon establishing a connection to a remote link partner. Moreover, these parameters may need to be periodically refreshed due to for example, environmental changes. In the event that one or more links 224 may be inactive for some amount of time, environmental conditions may change and training coefficients and/or parameters may need to be updated prior to activating data traffic on the link.

Figure 3:
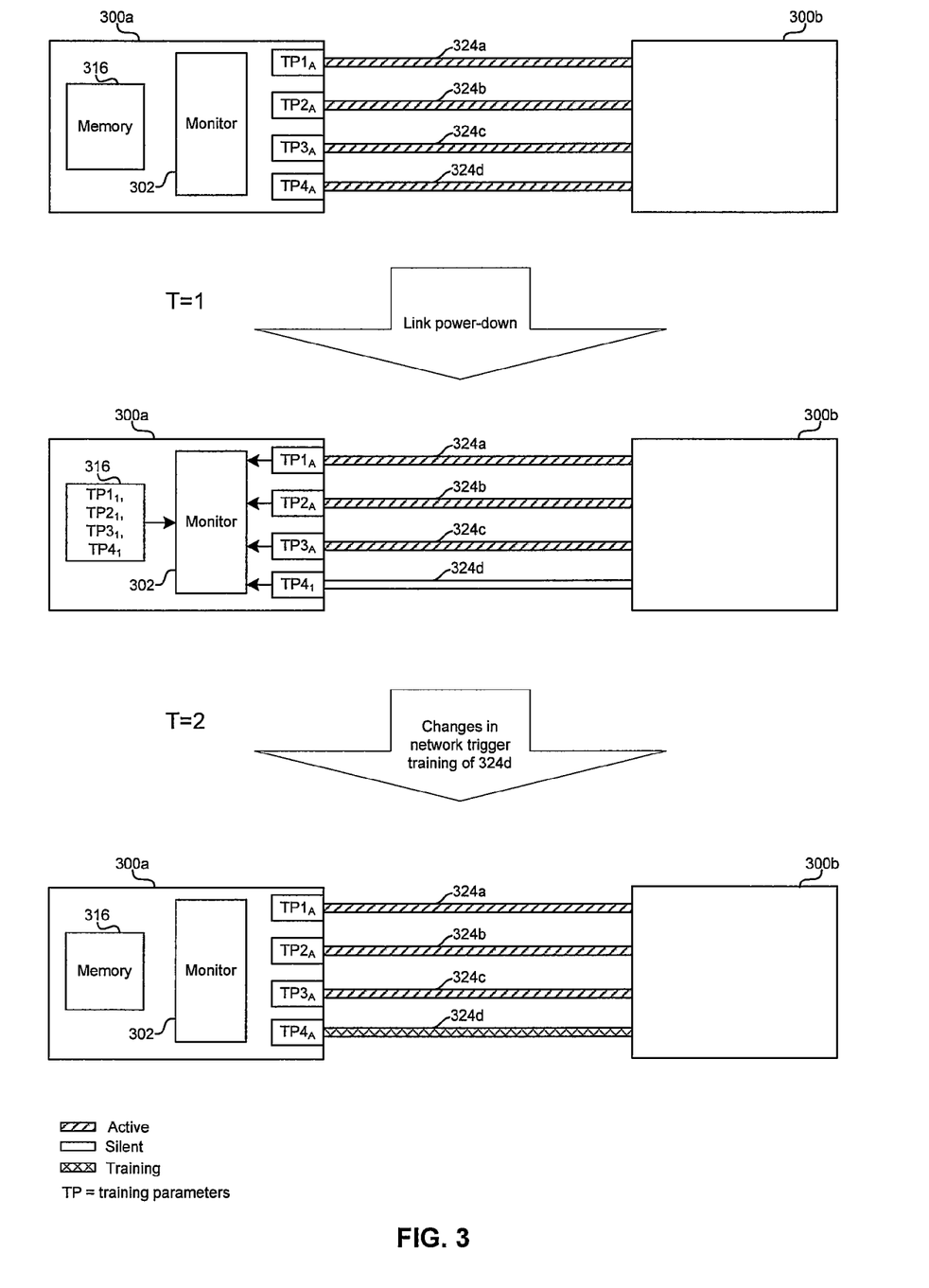
FIG. 3 is a diagram illustrating monitoring and training of Ethernet channels, in accordance with an embodiment of the invention.

FIG. 3 is a block diagram illustrating monitoring and training of Ethernet channels, in accordance with an embodiment of the invention. Referring to FIG. 3 there is shown the link partners 300a and 300b which may communicate via one or more of the channels 324a, 324b, 324c, and 324d. Each of the link partners 300a and 300b may comprise a memory 316 and a monitor block 302.

The link partners 300a and 300b may be similar or substantially the same as the link partners 102 and 104 described in FIG. 1 and link partner 200 described in FIG. 2. The memory 316 may be similar or substantially the same as the memory 216 described in FIG. 2. The channels 324a, 324b, 324c and 324d may be similar or substantially the same as the channels 224a, 224b, 224c and 224d described in FIG. 2.

The monitor block 302 may comprise suitable logic, circuitry, and/or code for monitoring, comparing, configuring, or otherwise processing training parameters TP1, TP2, TP3 and TP4 associated with channels 324a, 324b, 324c and 324d respectively. In this regard, the monitor block 302 may enable monitoring active channels 324a, 324b, 324c and 324d to determine when to re-train channels which are silent or in a low(er) power state. Exemplary conditions affecting channel training may comprise temperature, link type, link length, and electromagnetic coupling such as noise received from far-end and/or near-end neighboring cabling known as alien FEXT and alien NEXT respectively. The conditions affecting channel training may be monitored and when the conditions change by a determined amount, training of the link partners for one or more of the channels 324a, 324b, 324c, and 324d may be initiated. In various embodiments of the invention, since the link partners may be continuously trained for the active channels, training of the link partners for the silent channels may be initiated when training parameters associated with active channels deviate by a determined amount. For example, in instances when one or more thresholds may be exceeded, then this may trigger training of one or more link partners for a silent channel.

Thresholds may be determined in a plurality of ways. For example, they may be set to a fixed value, they may be based on measurements and/or they may be programmable. Moreover, thresholds may be, for example, an absolute number or a value relative to an existing parameter or measurement. The link partners may be trained for one or more silent channels by sending and receiving a pulse and/or a LDPC frame via the one or more silent channels for example. In this regard, training parameters for the one or more silent channels may remain valid during periods of diminished traffic demand. In accordance with various embodiments of the invention, having valid training parameters provisioned when traffic demand increases may reduce delay time needed to initiate transmission of data on the one or more silent channels. In general, having full training activity for a channel transitioning from a silent state to an active state may take up to the order of 100 ms or seconds. However, in accordance with various embodiments of the invention, the reduction in delay time needed to initiate transmission of data may, for example, reduce buffering requirements in link partners and associated cost.

In operation, prior to time instant T=1, the channels 324a, 324b, 324c, and 324d may be active and thus their respective training parameters $TP1_A$, $TP2_A$, $TP3_A$, and $TP4_A$ may be valid. In this regard, an 'A' subscript indicates that training parameters TP1, TP2, and TP3 are actively updated prior to time instant T=1.

At time instant T=1, the channel 324d may be powered down or put into a low(er) power state, and thus TP4 may no longer be updated. In this regard, the value or configuration of TP4 may remain where it was at time instant T=1 indicated by a subscript "1" in $TP4_1$. Additionally, values of the training parameters at time instant T=1, $TP1_1$, $TP2_1$, $TP3_1$ and $TP4_1$ may be stored, for example in the memory 316.

From time instant T=1 until just before time instant T=2, TP1, TP2, and TP3 may continue to be updated. Accordingly, the monitor 302 may be enabled to compare the current value of the training parameters $TP1_A$, $TP2_A$, $TP3_A$, $TP4_1$, to the value of the training parameters at time instant T=1 (stored in memory).

At time instant T=2, one or more of $TP1_A$, $TP2_A$, and $TP3_A$ may differ from $TP1_1$, $TP2_1$ and $TP3_1$ respectively by a determined amount. Accordingly, at time instant T=2, a training of the channel 324d may be initiated. In this manner, changes in training parameters for one or more link partners for one or more active channels may be utilized to determine when the one or more link partners may be retrained for one or more silent or low(er) power channels.

The invention may not be limited with regard to the number of active and silent channels described in FIG. 3. For example, one or more active channels may be monitored for training activity and this may be utilized to determine when one or more link partners may be retrained for one or more silent or lower power channels.

Figure 4:
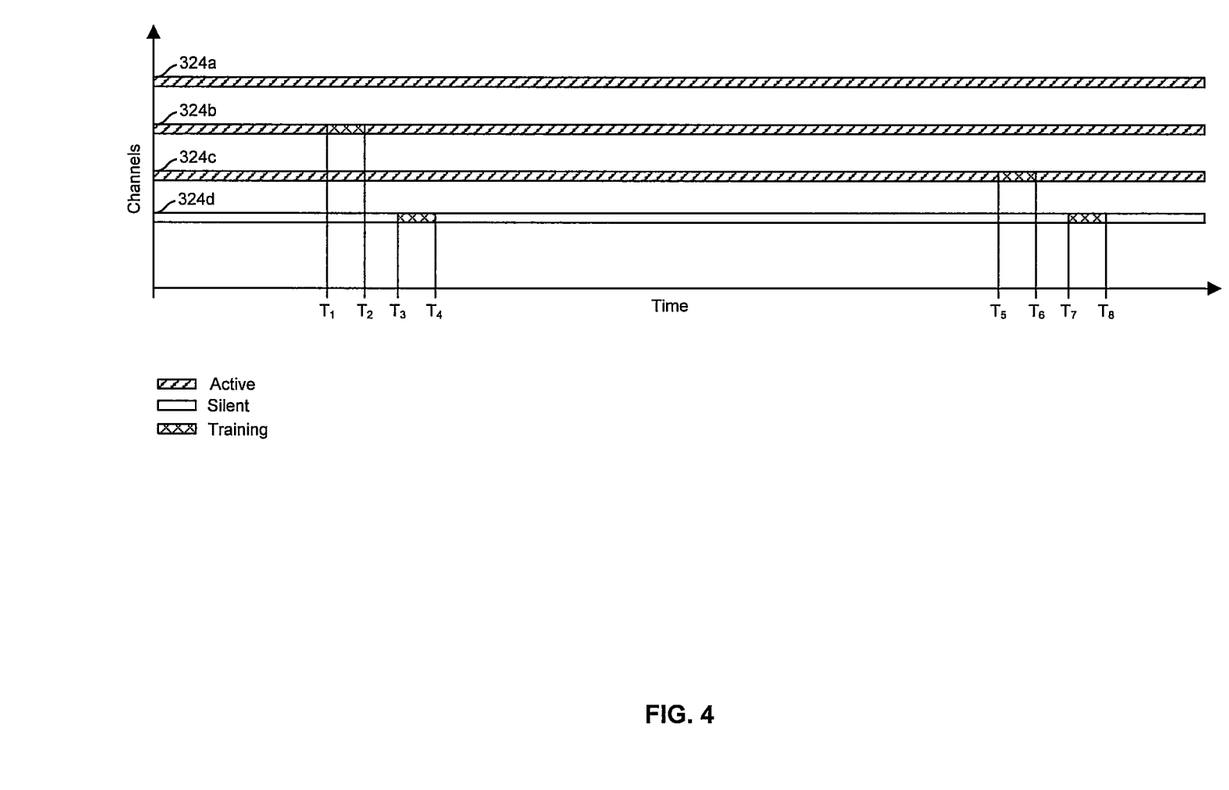
FIG. 4 is a block diagram illustrating training of link partners for a silent channel over time based on active channel triggers, in accordance with an embodiment of the invention.

FIG. 4 is a block diagram illustrating training of link partners for a silent channel over time based on active channel triggers, in accordance with an embodiment of the invention. Referring to FIG. 4 there are shown four Ethernet channels 324a, 324b, 324c and 324d described in FIG. 3 that may enable communication between the link partner 300a and 300b for example. The duration of channel activity is shown on a time line.

In operation, the link partners 300a and 300b may monitor training parameters and/or training activity on the Ethernet channels 324a, 324b and 324c and may determine when to train one or more of the link partners for the silent channel 324d based on active channel training parameters as describe in FIG. 3. The Ethernet channels 324a, 324b and 324c may be active for at least the duration of time from time instant $T_1$ through time instant $T_8$ and the Ethernet channel 324d may be silent or at a lower power during the same time duration except for training periods. At time instant $T_1$, training of a link partner for the active channel 324b may occur and training parameters for channel 324b may be modified accordingly. The training activity on 324b may trigger training activity of the link partner for the silent channel 324d. Between time instants $T_3$ and $T_4$, training of the link partner for channel 324d may occur, for example, based on a pulse or depleted LDCP frame transmitted via the channel 324d. For the duration between time instants $T_5$ and $T_6$, training of a link partner for the active channel 324c may occur and that may trigger training of a link partner for the silent channel 324d. Between time instants $T_7$ and $T_8$, the link partner may be trained for the silent channel 324d. In some embodiments of the invention, the duration of training of the link partner for the silent channel 324d may be up to the order of milliseconds or seconds and the duration between training processes for the link partner on the silent channel may be on the order of minutes. The invention may not be limited with regard to duration of training of the link partners for the silent channel and the duration between training of the link partners for the silent channels and may embody various durations.

Figure 5:
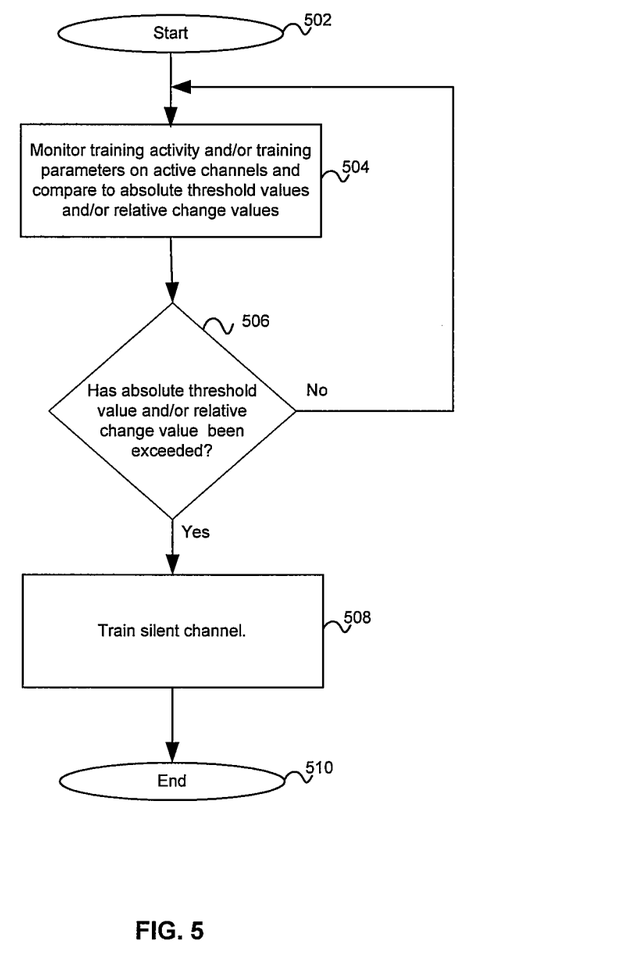
FIG. 5 is a flow chart illustrating exemplary steps for triggering training of a silent Ethernet channel based on active channel training activity, in accordance with an embodiment of the invention.

FIG. 5 is a flow chart illustrating exemplary steps for triggering training of a silent Ethernet channel based on active channel training activity, in accordance with an embodiment of the invention. Referring to FIG. 5, after start step 502, in step 504, training activity and/or changes in parameters, for example, coefficients for active channels such as channels 324a, 324b and/or 324c may be monitored, recorded and/or compared to a training trigger threshold. In this regard, a training trigger threshold may be an absolute number or a value relative to the compared parameter, for example. In step 506, in instances when the training trigger threshold has been exceeded, the process may proceed to step 508. In step 508, a silent channel such as the channel 324d may be trained based on, for example, a pulse transmitted via the silent channel or a transmitted depleted low density parity check (LDPC) frame that may or may not carry useful or control information. Step 510 may be an end of exemplary steps. In step 506, in instances when the training trigger threshold has not been exceeded, proceed to step 504.

In an embodiment of the invention, an Ethernet link between Ethernet link partners 300a and 300b for example, may comprise a plurality of channels such as channels 324a, 324b, 324c and 324d wherein one or more channels may be silent and one or more channels may be active. In this regard, determining when to train and the execution of training activity by one or more link partners for one or more silent channels such as channel 324d may be based on monitoring one or more active channel training parameters. For example, training parameters from active channels 324a, 324b and/or 324c may be monitored to determine when to train the silent channel 324d. The Ethernet link partners 300a and/or 300b may be trained for one or more silent channels such as 324d and the Ethernet link partners 300a and/or 300b corresponding to the silent channels 324d may be configured for the silent channels. In this regard, the one or more active channel training parameters may be compared to a threshold. The threshold may be a fixed value, which may be determined based on information gathered within the one or more link partners 300a and 300b and/or based on programmed information, for example. The Ethernet link partners 300a and/or 300b may be configured for the silent channels for an echo canceller, a far-end crosstalk canceller and/or a near-end crosstalk canceller. The silent channels may be trained based on a transmitted signal such as a pulse.

Another embodiment of the invention may provide a machine-readable storage, having stored thereon, a computer program having at least one code section executable by a machine, thereby causing the machine to perform the steps as described herein for monitoring and training Ethernet channels to support energy efficient Ethernet.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking in a first link partner that is coupled to a second link partner via a network cable, said network cable supporting a plurality of communication channels between said first and second link partners, the method comprising:
    transitioning said first link partner from an active state to a low power state, wherein during said active state the plurality of communication channels are each in an active mode, and during said low power state at least a first of the plurality of communication channels has transitioned from said active mode to a low power mode, wherein said first of the plurality of communication channels in said low power mode has a lower rate of communication relative to said first of the plurality of communication channels in said active mode;
    during said low power state, monitoring one or more parameters for one or more active mode communication channels, wherein said one or more parameters are used by one or more of an echo canceller, a far-end crosstalk canceller and a near-end crosstalk canceller in said first link partner;
    determining when to initiate a trigger for training parameters of at least said first of the plurality of communication channels in said low power mode based on said monitoring of said one or more parameters for said one or more active mode communication channels; and
    training said one or more parameters for at least said first of the plurality of communication channels in said low power mode upon an initiation of said trigger.

2. The method according to claim 1, comprising comparing said one or more parameters for said one or more active mode communication channels to one or more parameter thresholds and/or relative changes.

3. The method according to claim 2, comprising determining said one or more parameter thresholds and/or relative changes based on one or more fixed values.

4. The method according to claim 2, comprising determining said one or more parameter thresholds and/or relative changes based on information gathered within said first and second link partners.

5. The method according to claim 2, comprising determining said one or more parameter thresholds and/or relative changes based on programmable information.

6. A system for networking, the system including a first link partner that is coupled to a second link partner via a network cable, said network cable supporting a plurality of communication channels between said first and second link partners, the system comprising:
    one or more circuits in said first link partner, said one or more circuits being operable to:
        transition said first link partner from an active state to a low power state, wherein during said active state the plurality of communication channels are each in an active mode, and during said low power state at least a first of the plurality of communication channels has transitioned from said active mode to a low power mode, wherein said first of the plurality of communication channels in said low power mode has a lower rate of communication relative to said first of the plurality of communication channels in said active mode;
    during said low power state, monitor one or more parameters for one or more active mode communication channels, wherein said or more parameters are used by one or more of an echo canceller, a far-end crosstalk canceller and a near-end crosstalk canceller in said first link partner;
    determine when to initiate a trigger for training one or more parameters of at least said first of the plurality of communication channels in said low power mode based on said monitoring of said one or more parameters for said one or more active mode communication channels; and
    train said one or more parameters for at least said first of the plurality of communication channels in said low power mode upon an initiation of said trigger.

7. The system according to claim 6, wherein said one or more circuits enables a comparison of said one or more parameters for said one or more active mode communication channels to one or more parameter thresholds and/or relative changes.

8. The system according to claim 7, wherein said one or more circuits enable determination of said one or more parameter thresholds and/or relative changes based on one or more fixed values.

9. The system according to claim 7, wherein said one or more circuits enables determination of said one or more parameter thresholds and/or relative changes based on information gathered within said first and second link partners.

10. The system according to claim 7, wherein said one or more circuits enables determination of said one or more parameter thresholds and/or relative changes based on programmable information.

11. A method for networking in a first link partner that is coupled to a second link partner via a network cable, said network cable supporting a plurality of communication channels between said first and second link partners, the method comprising:
    transitioning said first link partner from an active state to a low power state, wherein during said active state all of the plurality of communication channels are in an active mode, and during said low power state at least a first of the plurality of communication channels has transitioned from said active mode to a low power mode, wherein said first of the plurality of communication channels in said low power mode has a lower rate of communication relative to said first of the plurality of communication channels in said active mode;
    during said low power state, monitoring one or more parameters for one or more active mode communication channels; and
    prior to a decision to transition said first link partner from said low power state back to said active state, training said one or more parameters for at least said first of the plurality of communication channels when said monitoring indicates that said one or more parameters for said one or more active mode communication channels has exceeded a threshold.

12. The method of claim 11, wherein said threshold value is based on a fixed value.

13. The method of claim 11, wherein said threshold value is based on a relative value.

14. The method of claim 11, wherein said threshold value is based on programmable information.

15. The method of claim 11, wherein said monitoring comprises monitoring parameters being used by one or more of an echo canceller, a far-end crosstalk canceller and a near-end crosstalk canceller in said first link partner.

* * * * *